US011269516B1

(12) United States Patent
Armangau et al.

(10) Patent No.: US 11,269,516 B1
(45) Date of Patent: Mar. 8, 2022

(54) PATTERN DETECTION SYSTEM AND METHOD

(71) Applicant: EMC IP Holding Company, LLC, Hopkinton, MA (US)

(72) Inventors: Philippe Armangau, Acton, MA (US); Pierluca Chiodelli, Ashland, MA (US); George Papadopoulos, Franklin, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 0 days.

(21) Appl. No.: 15/799,506

(22) Filed: Oct. 31, 2017

(51) Int. Cl.
*G06F 3/06* (2006.01)
*G06F 12/0864* (2016.01)
*G06F 12/128* (2016.01)

(52) U.S. Cl.
CPC .......... *G06F 3/0608* (2013.01); *G06F 3/065* (2013.01); *G06F 3/067* (2013.01); *G06F 3/0641* (2013.01); *G06F 12/0864* (2013.01); *G06F 12/128* (2013.01); *G06F 2212/6032* (2013.04); *G06F 2212/621* (2013.01)

(58) Field of Classification Search
CPC .. G06F 3/0608; G06F 12/128; G06F 17/3015; G06F 17/301
USPC ......... 707/625, 641, 664, 961; 711/128, 119
See application file for complete search history.

(56) References Cited

U.S. PATENT DOCUMENTS

| 3,938,097 | A | * | 2/1976 | Niguette, III | ....... G06F 12/0897 711/128 |
| 5,305,389 | A | * | 4/1994 | Palmer | ................ G06F 12/0862 382/305 |
| 7,809,888 | B1 | * | 10/2010 | Clark | .................. G06F 12/0871 711/118 |
| 2004/0049644 | A1 | * | 3/2004 | Chen | .................. G06F 21/6209 711/163 |
| 2014/0129779 | A1 | * | 5/2014 | Frachtenberg | ........ G06F 12/122 711/136 |

OTHER PUBLICATIONS https://en.wikipedia.org/wiki/Machine_code (retrieved Apr. 23, 2021) (Year: 2021).*
https://www.merriam-webster.com/dictionary/rate (retrieved Apr. 23, 2021) (Year: 2021).*
https://www.merriam-webster.com/dictionary/rate (retrieved Apr. 14, 2021) (Year: 2021).*

* cited by examiner

*Primary Examiner* — Michael Krofcheck
*Assistant Examiner* — John Francis Wojton
(74) *Attorney, Agent, or Firm* — Brian J. Colandreo; Mark H. Whittenberger; Holland & Knight LLP (57) ABSTRACT

A method, computer program product, and computing system for receiving content on a high-availability storage system. The content is compared to one or more entries in a static database associated with a cache memory system of the high-availability storage system. If the content does not match the one or more entries in the static database, the content is compared to one or more entries in a dynamic database associated with the cache memory system. If the content does not match the one or more entries in the dynamic database: the content is written to the cache memory system and a representation of the content is written to a temporal database associated with the cache memory system and maintained for a defined period of time.

19 Claims, 3 Drawing Sheets

PATTERN DETECTION SYSTEM AND METHOD

TECHNICAL FIELD

This disclosure relates to pattern detection systems and methods and, more particularly, to pattern detection systems and methods for use within data storage systems.

BACKGROUND

In today's IT infrastructure, high availability is highly important. And the storing and safeguarding of electronic content is of paramount importance in modern business. Accordingly, high-availability storage systems may be utilized to protect and provide availability to such electronic content, wherein various systems (e.g., cache memory systems) may be utilized to enhance the speed at which this electronic content may be accessed, while various methodologies (e.g., data compression and deduplication) may be utilized to enhance the efficiency of these high-availability storage systems.

SUMMARY OF DISCLOSURE

In one implementation, a computer-implemented method is executed on a computing device and include receiving content on a high-availability storage system. The content is compared to one or more entries in a static database associated with a cache memory system of the high-availability storage system. If the content does not match the one or more entries in the static database, the content is compared to one or more entries in a dynamic database associated with the cache memory system. If the content does not match the one or more entries in the dynamic database: the content is written to the cache memory system and a representation of the content is written to a temporal database associated with the cache memory system and maintained for a defined period of time.

One or more of the following features may be included. Writing a representation of the content to a temporal database associated with the cache memory system may include writing a fingerprint of the content to the temporal database associated with the cache memory system. If the content does match the one or more entries in the static database associated with the cache memory system of the high-availability storage system, the content is acknowledged without writing the content to the cache memory system, as the content is duplicative of a piece of content already stored in the high-availability storage system If the content does match the one or more entries in the dynamic database, the content is acknowledged without writing the content to the cache memory system, as the content is duplicative of a piece of content already stored in the high-availability storage system. One or more entries included within the temporal database associated with the cache memory system may be periodically reviewed to determine a hit rate for the one or more entries included within the temporal database. If the hit rate of the one or more entries included within the temporal database associated with the cache memory system is in a first range, the one or more entries may be deleted from the temporal database. If the hit rate of the one or more entries included within the temporal database associated with the cache memory system is in a second range, the one or more entries may be maintained within the temporal database. If the hit rate of the one or more entries included within the temporal database associated with the cache memory system is in a third range, the one or more entries may be promoted to the dynamic database.

In another implementation, a computer program product resides on a computer readable medium that has a plurality of instructions stored on it. When executed by a processor, the instructions cause the processor to perform operations including receiving content on a high-availability storage system. The content is compared to one or more entries in a static database associated with a cache memory system of the high-availability storage system. If the content does not match the one or more entries in the static database, the content is compared to one or more entries in a dynamic database associated with the cache memory system. If the content does not match the one or more entries in the dynamic database: the content is written to the cache memory system and a representation of the content is written to a temporal database associated with the cache memory system and maintained for a defined period of time.

One or more of the following features may be included. Writing a representation of the content to a temporal database associated with the cache memory system may include writing a fingerprint of the content to the temporal database associated with the cache memory system. If the content does match the one or more entries in the static database associated with the cache memory system of the high-availability storage system, the content is acknowledged without writing the content to the cache memory system, as the content is duplicative of a piece of content already stored in the high-availability storage system If the content does match the one or more entries in the dynamic database, the content is acknowledged without writing the content to the cache memory system, as the content is duplicative of a piece of content already stored in the high-availability storage system. One or more entries included within the temporal database associated with the cache memory system may be periodically reviewed to determine a hit rate for the one or more entries included within the temporal database. If the hit rate of the one or more entries included within the temporal database associated with the cache memory system is in a first range, the one or more entries may be deleted from the temporal database. If the hit rate of the one or more entries included within the temporal database associated with the cache memory system is in a second range, the one or more entries may be maintained within the temporal database. If the hit rate of the one or more entries included within the temporal database associated with the cache memory system is in a third range, the one or more entries may be promoted to the dynamic database.

In another implementation, a computing system includes at least one processor and at least one memory architecture coupled with the at least one processor, wherein the computing system is configured to perform operations including receiving content on a high-availability storage system. The content is compared to one or more entries in a static database associated with a cache memory system of the high-availability storage system. If the content does not match the one or more entries in the static database, the content is compared to one or more entries in a dynamic database associated with the cache memory system. If the content does not match the one or more entries in the dynamic database: the content is written to the cache memory system and a representation of the content is written to a temporal database associated with the cache memory system and maintained for a defined period of time.

One or more of the following features may be included. Writing a representation of the content to a temporal database associated with the cache memory system may include writing a fingerprint of the content to the temporal database associated with the cache memory system. If the content does match the one or more entries in the static database associated with the cache memory system of the high-availability storage system, the content is acknowledged without writing the content to the cache memory system, as the content is duplicative of a piece of content already stored in the high-availability storage system If the content does match the one or more entries in the dynamic database, the content is acknowledged without writing the content to the cache memory system, as the content is duplicative of a piece of content already stored in the high-availability storage system. One or more entries included within the temporal database associated with the cache memory system may be periodically reviewed to determine a hit rate for the one or more entries included within the temporal database. If the hit rate of the one or more entries included within the temporal database associated with the cache memory system is in a first range, the one or more entries may be deleted from the temporal database. If the hit rate of the one or more entries included within the temporal database associated with the cache memory system is in a second range, the one or more entries may be maintained within the temporal database. If the hit rate of the one or more entries included within the temporal database associated with the cache memory system is in a third range, the one or more entries may be promoted to the dynamic database.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
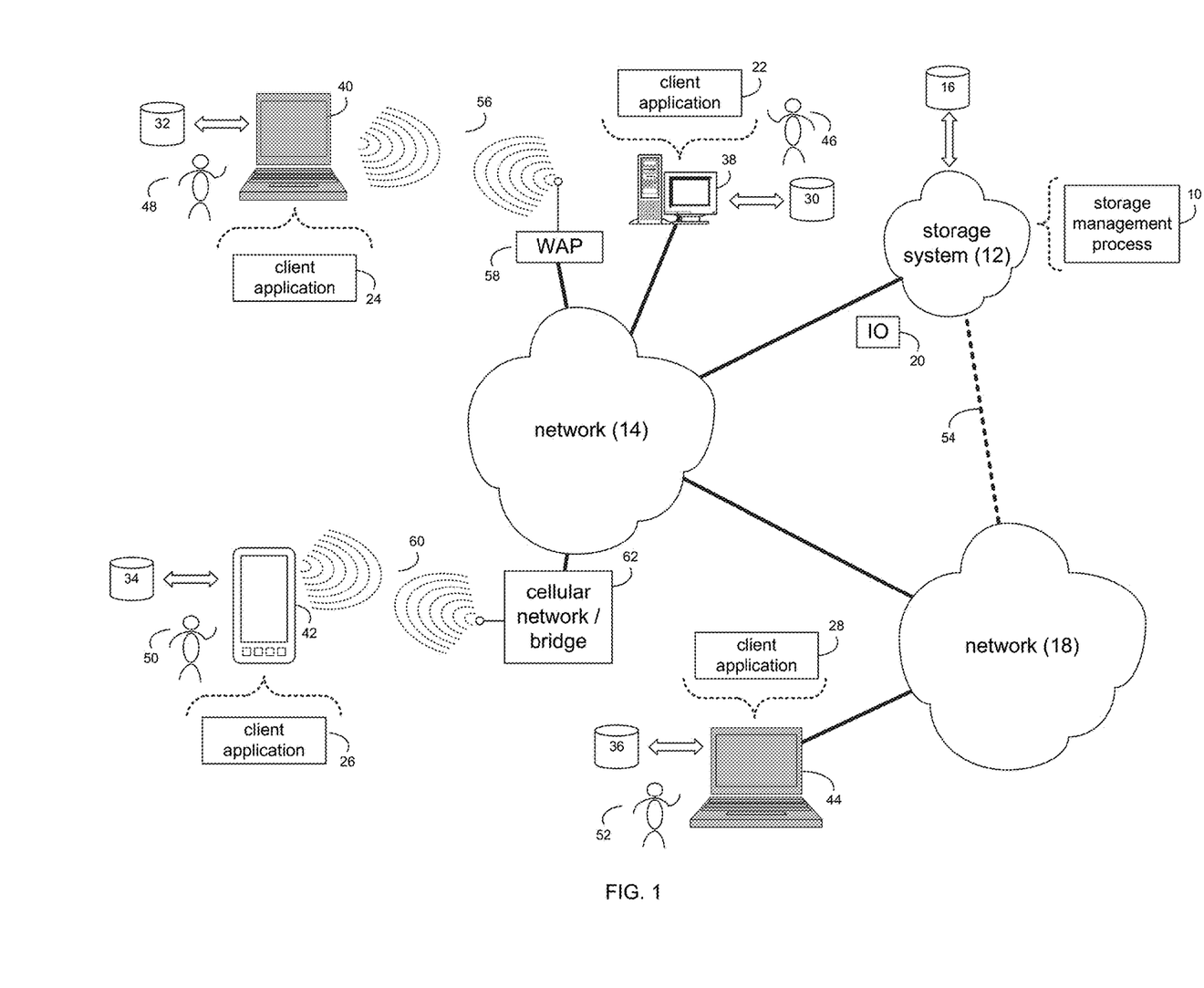
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to, high-availability storage systems such as: a Network Attached Storage (NAS) system, a Storage Area Network (SAN), a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
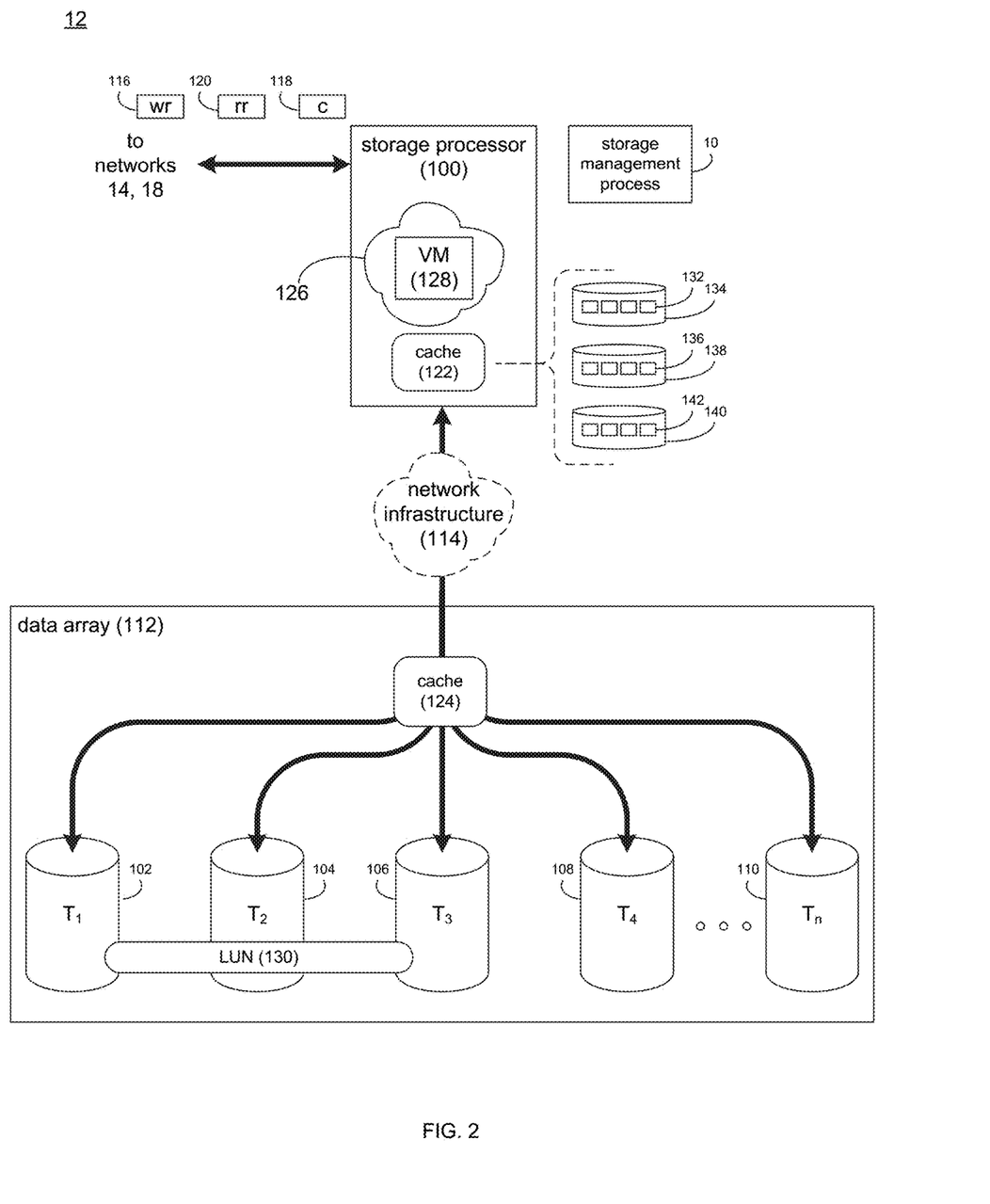
FIG. 2 is a diagrammatic view of an implementation of the storage system of FIG. 1.

Referring also to FIG. 2, there is shown one particular implementation of storage system 12. Storage system 12 may include storage processor 100 and a plurality of storage targets T1-n (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5 or RAID 6 array.

While in this particular example, storage system 12 is shown to include five storage targets (e.g. storage targets 102, 104, 106, 108, 110), this is for illustrative purposes only and is not intended to be a limitation of this disclosure. Specifically, the actual number of storage targets may be increased or decreased depending upon e.g. the level of redundancy/performance/capacity required.

One or more of storage targets 102, 104, 106, 108, 110 may be configured to store coded data. As is known in the art, coded data may allow for the regeneration of data lost/corrupted on one or more of storage targets 102, 104, 106, 108, 110.

Examples of storage targets 102, 104, 106, 108, 110 may include one or more electro-mechanical hard disk drives and/or one or more solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

The Storage Management Process:

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; an optical drive; a RAID device; a random access memory (RAM); a read-only memory (ROM); and all forms of flash memory storage devices. Additionally, some or all of the instruction sets and subroutines of storage management process 10 may be executed by one or more processors (not shown) and one or more memory architectures (not shown) included within data array 112.

As discussed above, various 10 requests (e.g. 10 request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100 and storage management process 10. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 and storage management process 10 may initially store content 118 within frontend cache memory system 122. Depending upon the manner in which frontend cache memory system 122 is configured, storage processor 100 and storage management process 10 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 and storage management process 10 may initially store content 118 within backend cache memory system 124 prior to being stored on e.g. one or more of storage targets 102, 104, 106, 108, 110.

Depending on the manner in which storage system 12 is configured, storage system 12 may be configured to execute virtual machine operating environment 126. An example of virtual machine operating environment 126 may include but is not limited to a hypervisor, which is an instantiation of an operating/file system that may allow for one or more virtual machines (e.g., virtual machine 128) to operate within a single physical device. Accordingly, the combination of virtual machine operating environment 126 and virtual machine 128 may allow one or more users to access the resources of storage processor 100 (and one or more additional storage processors, not shown) and data array 112 (and one or more additional data arrays, not shown). Through the use or storage system 12 and/or virtual machine operating environment 126, one or more LUNs (e.g., LUN 130) may be defined.

As is known in the art, LUN is an acronym for Logical Unit Number, which is a unique identifier that may designate one or more physical or virtual storage devices that are configured to execute I/O commands on a host computer. Typically, a logical unit number (i.e., a LUN) is assigned when a host scans a SCSI device and discovers a logical unit, wherein the LUN may identify the specific logical unit to e.g., a SCSI initiator (not shown). Although (technically) the term LUN is only the identifying number of a logical unit, the IT industry commonly uses LUN as shorthand to refer to the logical unit itself.

While in this example, LUN 130 is a logical storage unit that is constructed from portions of storage targets 102, 104, 106, this is for illustrative purposes only and is not intended to be a limitation of this disclosure, as other configurations are possible and are considered to be within the scope of this disclosure. For example, LUN 130 may be a portion of a single storage target, an entire storage target, or portions of multiple storage targets. Accordingly, it is understood that LUN 130 may refer to an entire RAID set, a single storage target (or storage partition), or multiple storage targets (or storage partitions).

As discussed above, storage system 12 may include frontend cache memory system 122 and/or backend cache memory system 124, wherein these cache memory systems 122, 124 may include but are not limited to a volatile, solid-state, cache memory system (e.g., a dynamic RAM cache memory system) and/or a non-volatile, solid-state, cache memory system (e.g., a flash-based, cache memory system).

While the following discussion concerns the manner in which frontend cache memory system 122 may operate, it is understood that this is for illustrative purposes only and is not intended to be a limitation of this disclosure, as other configurations are possible and are considered to be within the scope of this disclosure. For example, the following discussion may be equally applied to the manner in which backend cache memory system 124 may operate.

Figure 3:
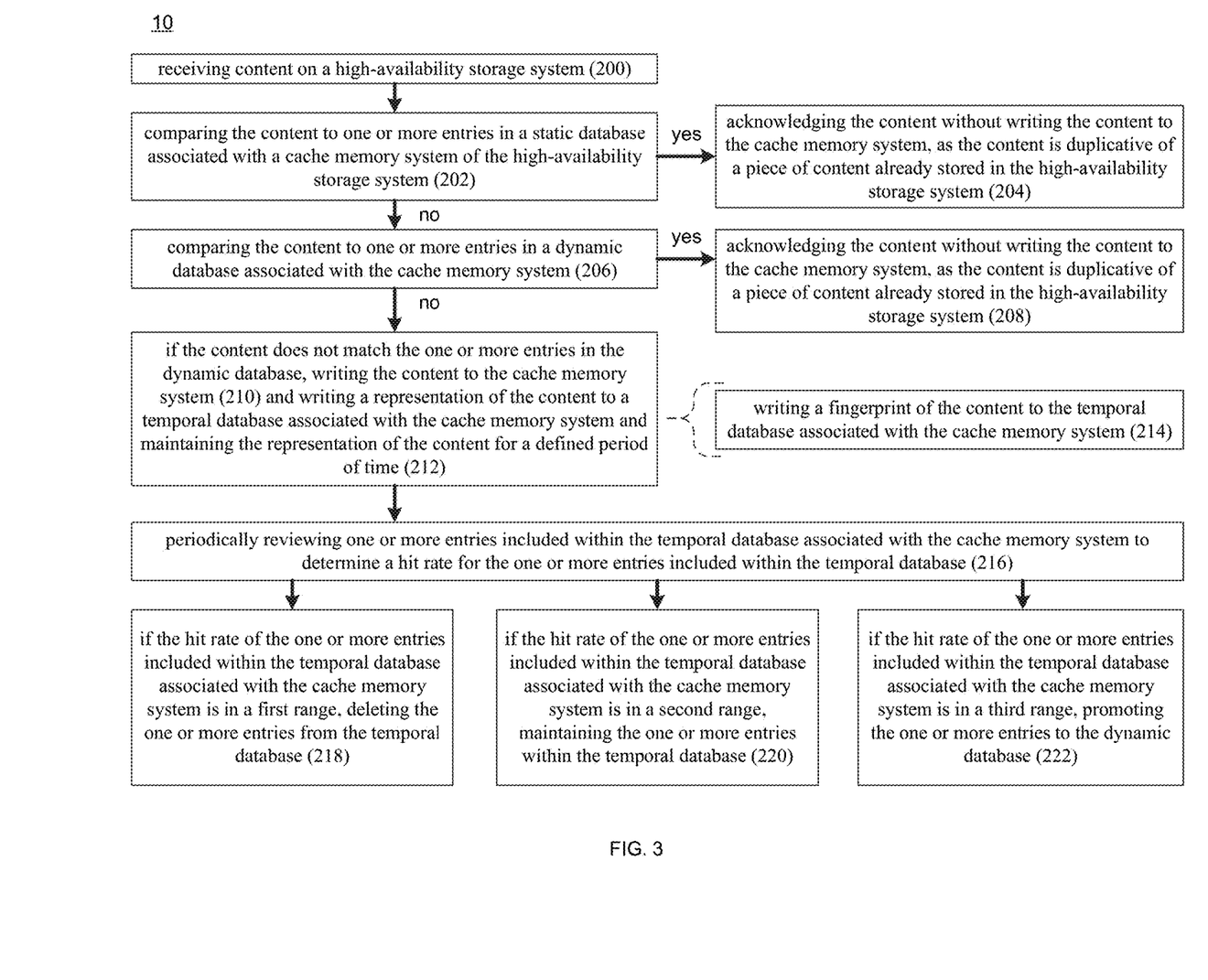
FIG. 3 is a flow chart of the storage management process of FIG. 1.

Referring also to FIG. 3, storage management process 10 may receive 200 content on a high-availability storage system. For example, storage management process 10 may receive 200 content 118 and write request 116 on storage system 12. In order to efficiently use the cache memory system (e.g., frontend cache memory system 122) of storage system 12 and upon receiving 200 content 118, storage management process 10 may compare 202 the content (e.g., content 118) received 200 to one or more entries (e.g., entries 132) in a static database (e.g., static database 134) associated with a cache memory system (e.g., frontend cache memory system 122) of the high-availability storage system (e.g., storage system 12).

For example and upon receiving 200 content 118, storage management process 10 may compare 202 content 118 (or a representation thereof) to entries 132 in static database 134 to determine if a match exists between content 118 and entries 132. Examples of entries 132 included within static database 134 may include but are not limited to patterns of data blocks (e.g., all 0s, all 1s, known patterns of 0s and 1s, etc.) expected to be received by storage system 12 and stored within frontend cache memory system 122. Specifically, these entries (e.g., entries 132) may be fingerprints (e.g., hash calculations) of data blocks already stored within frontend cache memory system 122) that may be compared 202 to a fingerprint generated for content 118.

If content 118 (or a representation thereof) does match the one or more entries (e.g., entries 132) in static database 134 associated with the cache memory system (e.g., frontend cache memory system 122) of the high-availability storage system (e.g., storage system 12), storage management process 10 may acknowledge 204 the receipt of content 118 without writing content 118 to the cache memory system (e.g., frontend cache memory system 122), as content 118 may be duplicative of a piece of content already stored within the high-availability storage system (e.g., storage system 12). Specifically, if content 118 does indeed match one or more of entries 132 in static database 134, content 118 had been previously stored within frontend cache memory system 122 and, therefore, does not need to be written again to frontend cache memory system 122.

Conversely and if content 118 (or a representation thereof) does not match the one or more entries (e.g., entries 132) in static database 134, storage management process 10 may compare 206 content 118 to one or more entries (e.g., entries 136) in a dynamic database (e.g., dynamic database 138) associated with the cache memory system (e.g., frontend cache memory system 122). Examples of entries 136 included within dynamic database 138 may be patterns of data blocks (e.g., all 0s, all 1s, known patterns of 0s and 1s, etc.) that were dynamically developed by storage system 12 (to be discussed below in greater detail) and stored within frontend cache memory system 122. For example, these entries (e.g., entries 136) may be fingerprints (e.g., hash calculations) of data blocks already stored within frontend cache memory system 122) that may be compared 206 to a fingerprint of content 118.

If content 118 (or a representation thereof) does match the one or more entries (e.g., entries 136) in dynamic database 138 associated with the cache memory system (e.g., frontend cache memory system 122) of the high-availability storage system (e.g., storage system 12), storage management process 10 may acknowledge 208 content 118 without writing content 118 to the cache memory system (e.g., frontend cache memory system 122), as content 118 may be duplicative of a piece of content already stored within the high-availability storage system (e.g., storage system 12). Specifically, if content 118 does indeed match one or more of entries 136 in dynamic database 138, content 118 had been previously stored within frontend cache memory system 122 and, therefore, does not need to be written again to frontend cache memory system 122.

Conversely and if content 118 (or a representation thereof) does not match the one or more entries (e.g., entries 136) in dynamic database 138: storage management process 10 may write 210 content 118 to the cache memory system (e.g., frontend cache memory system 122) and may write 212 a representation of content 118 to a temporal database (e.g., temporal database 140) associated with the cache memory system (e.g., frontend cache memory system 122), wherein this representation of content 118 may be maintained within temporal database 140 for a defined period of time.

Temporal database 140 may be a temporary database that is used to store content 118 (or representations thereof) on a temporary basis until it is determined whether or not the entry (e.g., one or more entries 142) associated the content (or representation thereof) temporarily stored within temporal database 140 should be added to dynamic database 138. When writing 212 a representation of content 118 to temporal database 140 associated with the cache memory system (e.g., frontend cache memory system 122), storage management process 10 may calculate a fingerprint (e.g., a hash calculation) of content 118 and may write 214 this fingerprint of content 118 to temporal database 140 associated with the cache memory system (e.g., frontend cache system 122).

During the operation of storage management process 10, new content (e.g., such as content 118) that is received and processed by storage system 12 may be written 210 within frontend cache memory system 122 and entries (e.g., one or more of entries 142) may be added to temporal database 140 to indicate the receipt and storage of this new content (e.g., content 118) within the cache memory system (e.g., frontend cache memory system 122).

Further and as additional new content is received and processed by storage system 12, storage management process 10 may compare this additional new content not only to entries 132 (within static database 134) and entries 136 (within dynamic database 138) but also to entries 142 within temporal database 140 to determine if the additional new content was previously written to the cache memory system (e.g., frontend cache memory system 122).

Storage management process 10 may periodically review 216 one or more entries (e.g., one or more of entries 142) included within temporal database 140 associated with the cache memory system (e.g., frontend cache memory system 122) to determine a hit rate for the one or more entries (e.g., one or more entries 142) included within temporal database 140. An example of such a hit rate may be the number of times that storage management process 10 determines that an entry (e.g., one or more entries 142) within temporal database 140 (or the content associated therewith) was matched with content received by storage system 12 during a unit time (e.g., a 24 hour period).

During the operation of storage system 12 and as new content (e.g., content 118) is received and processed by storage system 12, the quantity of entries (e.g., one or more entries 142) included within temporal database 140 may increase. Accordingly and by periodically reviewing 216 entries 142 included within temporal database 140, the quantity of entries 142 included within temporal database 140 may be managed.

As discussed above, storage management process 10 may write 212 a representation of content 118 to temporal database 140 associated with frontend cache memory system 122, wherein this representation of content 118 may be maintained within temporal database 140 for a defined period of time. An example of such a defined period of time may include 24 hours, after which storage management process 10 may periodically review 216 the one or more entries 142 included within temporal database 140 to determine a hit rate for the one or more entries 142.

For example, if the hit rate of the one or more entries (e.g., one or more of entries 142) included within temporal database 140 associated with the cache memory system (e.g., frontend cache memory system 122) is in a first range, storage management process 10 may delete 218 the one or more entries (e.g., one or more of entries 142) from temporal database 140. Specifically, if the hit rate of the one or more entries (e.g., one or more of entries 142) included within temporal database 140 associated with frontend cache memory system 122 is in a first range (e.g., 0-2 hits during the last 24 hours), storage management process 10 may delete 218 the one or more entries (e.g., one or more entries 142) from temporal database 140, as the one or more entries (e.g., one or more of entries 142) within temporal database 140 are not being utilized enough to justify keeping them within temporal database 140.

Further, if the hit rate of the one or more entries (e.g., one or more of entries 142) included within temporal database 140 associated with the cache memory system (e.g., frontend cache memory system 122) is in a second range, storage management process 10 may maintain 220 the one or more entries (e.g., one or more of entries 142) within temporal database 140. Specifically, if the hit rate of the one or more entries (e.g., one or more of entries 142) included within temporal database 140 associated with frontend cache memory system 122 is in a second range (e.g., 3-10 hits during the last 24 hours), storage management process 10 may maintain 220 the one or more entries (e.g., one or more of entries 142) within temporal database 140 for an additional period of time (e.g., an additional 24 hours), as the one or more entries (e.g., one or more entries 142) within temporal database 140 are being utilized enough to justify being maintained within temporal database 140 for an additional period of time.

Additionally, if the hit rate of the one or more entries (e.g., one or more of entries 142) included within temporal database 140 associated with the cache memory system (e.g., frontend cache memory system 122) is in a third range, storage management process 10 may promote 222 the one or more entries (e.g., one or more entries 142) to dynamic database 138. Specifically, if the hit rate of the one or more entries (e.g., one or more entries 142) included within temporal database 140 associated with frontend cache memory system 122 is in a third range (e.g., greater than 10 hits during the last 24 hours), storage management process 10 may promote 222 the one or more entries (e.g., one or more entries 142) from temporal database 140 to dynamic database 138, as the one or more entries (e.g., one or more of entries 142) within temporal database 140 are being utilized enough to justify including them within dynamic database 138.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method of pattern detection, executed on a computing device, comprising:
   receiving content from a write request on a storage system, wherein the write request is a request that the content be written to the storage system, wherein the storage system includes a frontend cache memory system and a backend cache memory system, wherein the frontend cache memory system includes a static database, a dynamic database, and a temporal database;
   comparing the content to one or more entries stored in the static database located within the frontend cache memory system of the storage system, wherein the one or more entries stored in the static database include a number of patterns of data blocks stored within the frontend cache memory system, wherein each of the one or more entries stored in the static database are written as one or more fingerprints of the data blocks stored within the frontend cache memory system;
if the content does not match the one or more entries stored in the static database, comparing the content to one or more entries stored in the dynamic database located within the frontend cache memory system;
if the content does not match the one or more entries stored in the dynamic database:
    writing the content to the frontend cache memory system; and
    writing a representation of the content to the temporal database located within the frontend cache memory system, including writing a fingerprint of the content to the temporal database located within the frontend cache memory system, and maintaining the representation of the content for a defined period of time wherein the one or more fingerprints of the data blocks associated with the one or more entries stored in the static database are compared to the fingerprint of the content of the temporal database located within the frontend cache memory system;
reviewing one or more entries stored in the temporal database located within the frontend cache memory system to determine a hit rate for the one or more entries stored in the temporal database, wherein the hit rate for the one or more entries stored in the temporal database includes, at least in part, a first range, wherein the first range includes a hit rate of a number of hits within the defined period of time.

2. The computer-implemented method of claim 1 further comprising one or more of:
    if the content does match the one or more entries stored in the static database located within the frontend cache memory system of the storage system, acknowledging the content without writing the content to the frontend cache memory system, as the content is duplicative of a piece of content already stored in the storage system; and
    if the content does match the one or more entries stored in the dynamic database, acknowledging the content without writing the content to the frontend cache memory system, as the content is duplicative of a piece of content already stored in the storage system.

3. The computer-implemented method of claim 1 further comprising:
    if the hit rate of the one or more entries stored in the temporal database located within the frontend cache memory system is in the first range, deleting the one or more entries from the temporal database.

4. The computer-implemented method of claim 1 further comprising:
    if the hit rate of the one or more entries stored in the temporal database located within the frontend cache memory system is in a second range, maintaining the one or more entries within the temporal database.

5. The computer-implemented method of claim 1 further comprising:
    if the hit rate of the one or more entries stored in the temporal database located within the frontend cache memory system is in a third range, promoting the one or more entries to the dynamic database.

6. The computer-implemented method of claim 1, wherein the one or more entries stored in the dynamic database include a number of patterns of data blocks stored within the frontend cache memory system.

7. The computer-implemented method of claim 6, wherein the number of patterns of data blocks stored within the frontend cache memory system include at least one of all 0s, all 1s, and varied 0s and 1s.

8. The computer-implemented method of claim 1, wherein the number of hits within the defined period of time for the first range is 0-2 hits within 24 hours.

9. The computer-implemented method of claim 1, wherein the hit rate for the one or more entries is indicative of a number of times that the one or more entries stored in the temporal database is matched with the content received by the storage system during the defined period of time.

10. A computer program product residing on a non-transitory computer readable medium having a plurality of instructions stored thereon which, when executed by a processor, cause the processor to perform operations comprising:
    receiving content from a write request on a storage system, wherein the write request is a request that the content be written to the storage system, wherein the storage system includes a frontend cache memory system and a backend cache memory system, wherein the frontend cache memory system includes a static database, a dynamic database, and a temporal database;
    comparing the content to one or more entries stored in the static database located within the frontend cache memory system of the storage system, wherein the one or more entries stored in the static database include a number of patterns of data blocks stored within the frontend cache memory system, wherein each of the one or more entries stored in the static database are written as one or more fingerprints of the data blocks stored within the frontend cache memory system;
    if the content does not match the one or more entries in the static database, comparing the content to one or more entries stored in the dynamic database located within the frontend cache memory system;
    if the content does not match the one or more entries in the dynamic database:
        writing the content to the frontend cache memory system; and
        writing a representation of the content to the temporal database located within the frontend cache memory system, including writing a fingerprint of the content to the temporal database located within the frontend cache memory system, and maintaining the representation of the content for a defined period of time wherein the one or more fingerprints of the data blocks associated with the one or more entries stored in the static database are compared to the fingerprint of the content of the temporal database located within the frontend cache memory system; and
    reviewing one or more entries stored in the temporal database located within the frontend cache memory system to determine a hit rate for the one or more entries stored in the temporal database, wherein the hit rate for the one or more entries stored in the temporal database includes, at least in part, a first range, wherein the first range includes a hit rate of a number of hits within the defined period of time.

11. The computer program product of claim 10 further comprising one or more of:
    if the content does match the one or more entries stored in the static database located within the frontend cache memory system of the storage system, acknowledging the content without writing the content to the frontend cache memory system, as the content is duplicative of a piece of content already stored in the storage system; and if the content does match the one or more entries stored in the dynamic database, acknowledging the content without writing the content to the frontend cache memory system, as the content is duplicative of a piece of content already stored in the storage system.

12. The computer program product of claim 10 further comprising:

if the hit rate of the one or more entries stored in the temporal database located within the frontend cache memory system is in the first range, deleting the one or more entries from the temporal database.

13. The computer program product of claim 10 further comprising:

if the hit rate of the one or more entries stored in the temporal database located within the frontend cache memory system is in a second range, maintaining the one or more entries within the temporal database.

14. The computer program product of claim 10 further comprising:

if the hit rate of the one or more entries stored in the temporal database located within the frontend cache memory system is in a third range, promoting the one or more entries to the dynamic database.

15. A computing system including a processor and memory configured to perform operations comprising:

receiving content from a write request on a storage system, wherein the write request is a request that the content be written to the storage system, wherein the storage system includes a frontend cache memory system and a backend cache memory system, wherein the frontend cache memory system includes a static database, a dynamic database, and a temporal database;

comparing the content to one or more entries stored in the static database located within the frontend cache memory system of the storage system, wherein the one or more entries stored in the static database include a number of patterns of data blocks stored within the frontend cache memory system, wherein each of the one or more entries stored in the static database are written as one or more fingerprints of the data blocks stored within the frontend cache memory system;

if the content does not match the one or more entries stored in the static database, comparing the content to one or more entries stored in the dynamic database located within the frontend cache memory system;

if the content does not match the one or more entries stored in the dynamic database:

writing the content to the frontend cache memory system; and writing a representation of the content to the temporal database located within the frontend cache memory system, including writing a fingerprint of the content to the temporal database located within the frontend cache memory system, and maintaining the representation of the content for a defined period of time; and reviewing one or more entries stored in the temporal database located within the frontend cache memory system to determine a hit rate for the one or more entries stored in the temporal database, wherein the hit rate for the one or more entries stored in the temporal database includes, at least in part, a first range, wherein the first range includes a hit rate of a number of hits within the defined period of time wherein the one or more fingerprints of the data blocks associated with the one or more entries stored in the static database are compared to the fingerprint of the content of the temporal database located within the frontend cache memory system.

16. The computing system of claim 15 further comprising one or more of:

if the content does match the one or more entries stored in the static database located within the frontend cache memory system of the storage system, acknowledging the content without writing the content to the frontend cache memory system, as the content is duplicative of a piece of content already stored in the storage system; and if the content does match the one or more entries stored in the dynamic database, acknowledging the content without writing the content to the frontend cache memory system, as the content is duplicative of a piece of content already stored in the storage system.

17. The computing system of claim 15 further comprising:
if the hit rate of the one or more entries stored in the temporal database located within the frontend cache memory system is in the first range, deleting the one or more entries from the temporal database.

18. The computing system of claim 15 further comprising:
if the hit rate of the one or more entries stored in the temporal database located within the frontend cache memory system is in a second range, maintaining the one or more entries within the temporal database.

19. The computing system of claim 15 further comprising:
if the hit rate of the one or more entries stored in the temporal database located within the frontend cache memory system is in a third range, promoting the one or more entries to the dynamic database.

* * * * *